United States Patent [19]

Koerner et al.

[11] 3,882,055
[45] May 6, 1975

[54] PROCESS OF PRODUCING FOAMS FROM UNSATURATED POLYESTERS

[75] Inventors: Götz Koerner, Essen; Gerd Rossmy, Essen-Werden, both of Germany

[73] Assignee: Th. Goldschmidt AG

[22] Filed: Apr. 4, 1973

[21] Appl. No.: 347,875

Related U.S. Application Data

[63] Continuation-in-part of Ser. No. 201,103, Nov. 22, 1971, abandoned, which is a continuation-in-part of Ser. No. 836,987, June 26, 1969, Pat. No. 3,634,344.

[30] Foreign Application Priority Data

July 4, 1968 France ................................ 157859

[52] U.S. Cl.... 260/2.5 N; 260/2.5 AN; 260/2.5 AH; 260/448.2 R; 260/448.8 R
[51] Int. Cl. ...................... C08g 22/44; C08g 53/10
[58] Field of Search ............ 260/2.5 E, 2.5 F, 2.5 N, 260/2.5 AH

[56] References Cited
UNITED STATES PATENTS

| | | | |
|---|---|---|---|
| 3,061,558 | 10/1962 | Alter | 260/2.5 E |
| 3,271,331 | 9/1966 | Ender | 260/2.5 F |
| 3,367,890 | 2/1968 | McManamie | 260/2.5 N |
| 3,634,344 | 1/1972 | Koerner | 260/2.5 AH |

*Primary Examiner*—Morton Foelak
*Attorney, Agent, or Firm*—Toren, McGrady and Stanger

[57] ABSTRACT

A process of producing polyester foams on the basis of hardenable unsaturated polyesters in the presence of surface active foam stabilizers. The invention provides that a foam stabilizer is used which is a polyoxalkylene-polysiloxane mixed block polymer. The block polymer is characterized in that a. the polyoxyalkylene blocks of the polymer have an average mole weight of about between 500 to 3000 and essentially consist of 40 to 100 percent by weight of ethylene oxide, the remainder being propylene oxide and/or higher alkylene oxides, with the proviso that when the proportion of ethylene oxide is 40 – 60 percent by weight, the molecular weight of the polyoxyalkylene blocks is >2000, and b. the polysiloxane blocks of the polymer contain on the average 3 to 35 silicon atoms of which 2 through 30 are present in the form of dimethylsiloxy groups while the remaining silicon atoms form trifunctional siloxy units.

8 Claims, No Drawings

PROCESS OF PRODUCING FOAMS FROM UNSATURATED POLYESTERS

CROSS REFERENCE TO PRIOR APPLICATION

This application is a Continuation-In-Part of copending application Ser. No. 201,103 filed Nov. 22, 1971 now abandoned, which in turn was a Continuation-In-Part of Ser. No. 836,987 filed June 26, 1969 for PROCESS FOR PRODUCING POLYESTER FOAMS, now U.S. Pat. No. 3,634,344.

FIELD OF INVENTION

The invention relates to a procedure for the production of polyester foams on the basis of hardenable, unsaturated polyesters, which are foamed in the presence of surface active foam stabilizers.

BACKGROUND INFORMATION AND PRIOR ART

It has previously been suggested to produce foams on the basis of polyesters which bear OH-functions as terminal groups. These polyester polyols are reacted with isocyanates. In doing so highly polymer substances are formed which primarily are linked through urethane and urea groupings.

The production of foams from unsaturated polyesters whose polymer structure is formed by polymerization of unsaturated compounds contained in the polyesters has also previously been disclosed. Reference is thus had to French Pat. No. 1535796 and British Pat. No. 975367. If the unsaturated polyesters contain free OH groups, an additional linking through isocyanate and thus a combination of both processes are rendered possible.

Polyester urethane foams are foamed by low boiling organic solvents which evaporate in the course of the reaction and/or by $CO_2$ which is formed in the reaction of isocyanate and water. By contrast, in the production of unsaturated polyester foams, carboxylic acid-carbonic acid ester anhydrides, for example carbonic acid ethyl ester anhyride, may also be used as foaming agent. These anhydrides decompose at elevated temperature under evolution of $CO_2$, which serves as propellant.

The main starting material, both in polyester urethane foam systems as well as in unsaturated polyester foam systems is thus a polyester. Consequently it was not surprising to find that surface active products selected as stabilizers for polyester urethane foams exhibit also a satisfactory stabilizing effect in unsaturated polyester urethane foam systems.

However, it is decidedly surprising that stabilizers which exhibit insufficient stabilizing effect in polyester urethane foams yield satisfactory to excellent foaming results in unsaturated polyester systems. This means that a different selection principle has to be considered.

SUMMARY OF THE INVENTION

It is a primary object of the present invention to provide foam stabilizers which are eminently suitable for the stabilization of polyester foams on the basis of hardenable unsaturated polyesters.

Briefly, and in accordance with this invention, it has been ascertained that superior foam stabilizers for foaming systems on the basis of hardenable unsaturated polyesters are polyoxyalkylene-polysiloxane mixed block polymers which are characterized by the following characteristics:

a. the polyoxyalkylene blocks have an average molecular weight of from about 500 to 3000 and essentially consist of 40 to 100 percent by weight of ethylene oxide, the remainder of the polyoxyalkylene blocks being constituted of propyleneoxide and, if desired, higher alkylene oxides. However, the proviso applies that if the weight proportion of ethylene oxide is 40 to 60 percent by weight then the molecular weight of the polyoxyalkylene block has to be > 2000;

b. the polysiloxane blocks of the mixed block polymer contain on the average 3 – 35 silicon atoms of which 2 – 30 are present in the form of dimethylsiloxy groups. The remaining silicon atoms form trifunctional siloxy units. The siloxy units may be linked to the polyoxyalkylene block.

Particularly preferred polyoxyalkylene-polysiloxane mixed block polymers are those which have 1.5 to 5, preferably 1.5 to 3, polyoxyalkylene glycol blocks in the average molecule. It is of particular advantage if the polysiloxane block has a very narrow molecular weight distribution, to wit the molecular weight of the individual blocks is in close proximity to a mean value, or if the polysiloxane, which is used for the preparation of the mixed block polymer, has been equilibrated prior to reation with the polyoxyalkylene derivatives.

The different alkylene oxide units within the polyoxyalkylene block are preferably mixed in approximately statistical manner. In doing so, the propylene oxide portion within the polyoxyalkylene block may be increased if the number of dimethylsiloxy groups is reduced.

Examples of polyoxyalkylene-polysiloxane mixed block polymers which can successfully be used in the inventive process are depicted in formulae I and II which, of course, should be viewed as average formulae. The polyoxyalkylene-polysiloxane mixed block polymer may thus be represented by the following formula I:

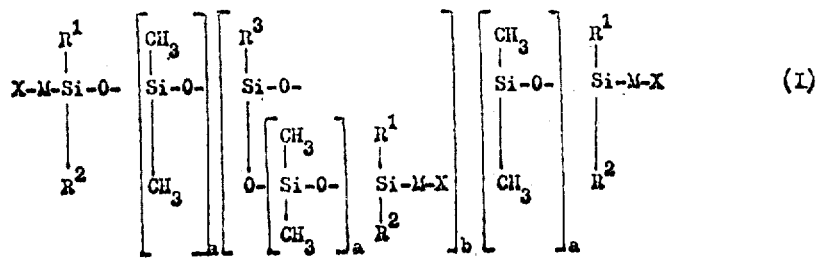

In this formula, X stands for a polyoxyalkylene block of the formula $$[-C_nH_{2n}O]_mZ.$$

The symbols $m$ and $n$ indicate suitable numbers whose specific values are determined by the specified requirement for the ethylene oxide content and the mole weight. $n$ may, for example, have the value of 2. The polyoxyalkylene block consists then exclusively of ethylene oxide units. The value of $n$ increases with increasing contents of propylene oxide and, if present, higher alkylene oxides.

Z indicates a terminal substituent, and is preferably alkyl, aryl or acyl.

If M is an oxygen atom, then a portion of the X groups may stand for alkyl or trialkylsilyl. However, the maximum amount of X groups having such meanings is 50 percent.

M represents the atom or group which connects in a manner known per se, the polysiloxane block and the polyoxyalkylene block. Examples of such linking members, as they are known in the art, are for example,

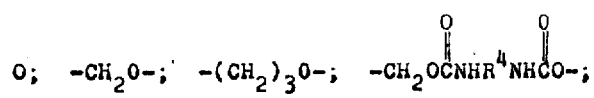

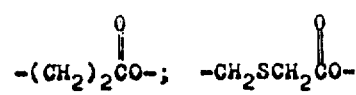

$R^4$ is a divalent hydrocarbon which, if desired, may be substituted. An example for such hydrocarbon is 2,4-toluylene. Generally, however, other hydrocarbon groups which connect silicon and X through an oxygen atom linked to X, are suitable for the inventive purposes.

The groups $R^1$ and $R^2$ stand for hydrocarbon, particularly lower alkyl, as for example, methyl. They may, however, also stand for MX.

$R^3$ may be the same as $R^1$ or may be

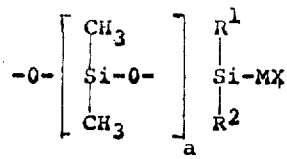

$a$ is a number having a value of 0 to 10, while $b$ is a number from 0 to 4. The values for $a$ and $b$ are moreover interrelated inasmuch as they must satisfy the conditions that $$6 \geq a > 0$$

and $$b = 0 \text{ to } 4$$

that at the most 35 and at least 3 Si-atoms are contained in the polysiloxane block and that of these Si-atoms, at least 2 and at the most 30 are present in the form of dimethylsiloxy units.

Another structure suitable for the inventive purpose is depicted by the following formula II.

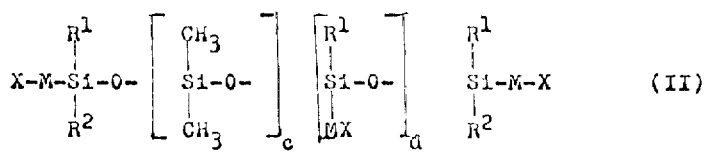 (II)

The substituents of this formula have the same meaning as in formula I. Symbol $c$ is a number having a value of between 1 to 29, while $d$ is a number having a value of between 0 to 4 and $c+d = 1$ to 33.

The expression "hardenable unsaturated polyesters" has an art-recognized meaning. For the purposes of this invention the term, in accordance with the art-recognized meaning, refers to reaction products of at least partially unsaturated dicarboxylic acids and diols and includes reaction systems wherein a small amount of trifunctional starting materials, such as acids and alcohols, were employed in the preparation of the reaction components. The reaction products of the at least partially unsaturated dicarboxylic acids and the diols are employed in solution form, the solvents being unsaturated monomers, whose double bonds are capable of radical-initiated copolymerization with the double bonds of the polyester component.

Such preprepared solutions, ready for use, are well known in the art and are readily available on the market under many different brand names. The molecular weight of the unsaturated polyester in these market-available solutions is preferably in the range between 1,000 and 5,000.

The following is an exemplary, although not exhaustive, summary of the chemical possibilities for such unsaturated polyesters pursuant to the present state of the art:

Dealing first with the monomeric, unsaturated solvents referred to, styrene, vinyltoluene, methylmethacrylate, methylacrylate or mixtures of the acrylates with styrene are preferably used. Further, nucleus-halogenated styrene is suitable since this solvent imparts superior fire resistance to the polymerization products. Moreover, it has been proposed to use allylesters, such as, for example, diallylphthalate, and also allyl ether. The last mentioned solvents are, however, less advantageous for foaming purposes, since they have an increased tendency for autoxidation.

In respect of the difunctional acidic component, it is known in the art to use preferably a mixture of unsaturated and saturated acids, rather than to use unsaturated acids exclusively.

Although many unsaturated difunctional acids may be employed, the present state of the art prefers the isomeric maleic and fumaric acids. The proportion of the moieties in the polyester which are derived from the fumaric- or maleic acid is influenced by the reaction conditions prevailing during the esterification, to wit, during the preparation of the starting materials, and can not readily be controlled by the foam producer.

Itaconic acid is another difunctional acid which is suitable for unsaturated polyester production.

Among the saturated dicarboxylic acids which are frequently used in the acid mixtures referred to, the following are preferred: Phthalic acid, iso-phthalic acid, tetrahydrophthalic acid; aliphatic dicarboxylic acids, such as adipic acid, succinic acid or alkylated succinic acid, as well as mixtures of aliphatic dicarboxylic acids with phthalic acid or iso-phthalic acid. In order to obtain good flame protection, the mentioned compounds which are based on phthalic acid proper may be partially or entirely replaced by hexachloroendomethylenetetrahydrophthalic acid, tetrachloro- or tetrabromophthalic acid.

Turning now to the diolic compounds, the following are preferred in the art: ethyleneglycol, propyleneglycol-1,2, butanediol-1,3, neopentylglycol, n-hexanediol-1,6, dioxethylated bisphenol A, as well as di- and tri-ethylene glycol.

As stated above and with a view to obtaining optimum characteristics of the unsaturated polyesters, the preparation is sometimes effected in the presence of small quantities of trifunctional compounds. These additional functions can be optionally introduced into the system through the acidic or the alcoholic component. Preferred trifunctional compounds for this purpose are glycerin, trimethylolpropane and trimellitic acid.

The foam stabilizers of this invention are suitable for stabilizing foam systems of all the unsaturated polyesters as hereinabove described.

Generally, the inventive stabilizers are also suitable for the stabilization of foams of unsaturated polyester systems in which the double bonds are introduced by unsaturated diols as distinguished from unsaturated acids. However, from a practical point of view, such polyester systems are less desirable due to their tendency for autoxidation a tendency which is particularly pronounced in systems derived from allylethers.

The preparation of the compounds to be used in accordance with this invention and, of course, also of the compounds indicated in the Examples, is effected in accordance with well-known procedures.

The invention will now be described by several Examples, it being understood, however, that these Examples are given by way of illustration and not by way of limitation and that many changes may be effected without affecting in any way the scope and spirit of the invention as recited in the appended claims.

EXAMPLE I

The purpose of this example is to demonstrate the surprising technical advance of the inventive process. All the polyoxyalkylene-polysiloxane-mixed block polymers which are compared in this example were prepared in a manner analogous to the process disclosed in U.S. Pat. No. 3,115,512 from equilibrated chlorosiloxanysulfates by reaction with polyoxyalkylenemonobutylethers.

The chlorosiloxanysulfates can also properly be depicted by the formula I, wherein the group MX in this instance stands for Cl and ($SO_4/2$). The $SO_4$-content amounts to about 1.3 to 1.8 g/silicon atom in the average molecule. The groups $R^1$, $R^2$, and $R^3$ stand for methyl.

The polyoxyalkylenemonobutylethers were produced by addition of a mixture of ethyleneoxide and propyleneoxide in quasi statistical manner to butanol, until the desired mole weight had been obtained. In doing so, care was taken that the alkylene oxide which is added last is propylene oxide.

The reaction of these polyoxyalkylenemonobutylethers with the equilibrated chlorosiloxanylsulfates takes place in a toluene solution under neutralization with ammonia. The final products may also be represented by the formula I, wherein M stands for oxygen and X corresponds to the formula

$[C_nH_{2n}O]_mC_4H_9$.

The values for $n$ and $m$ are dependent on the mole weights of the polyoxyalkylene blocks indicated in the following Table 1. The values of $a$ and $b$ are also indicated in Table 1.

Testing of the effectiveness of the polyoxyalkylene-polysiloxane mixed block polymers was done by a foaming test. For this purpose 110 g of a solution of 72 percent concentration of an unsaturated polyester resin on the basis of maleic acid and phthalic acid anhydride in styrene (this is the polyester component of the commercially available product LEGUVAL KU/Ue 7,100).

3 parts of a benzoylperoxide paste of 50 percent concentration, and 8.6 parts of a customary propellant on the basis of carboxylic acid carbonic acid ester anhydride (commercially available under the name LEGUPOR LE) were used.

The foam stabilizers listed in Table 1 were added in a quantity of 1 percent by weight calculated on the solution of the unsaturated polyester in styrene. The foaming was performed in such a manner, that the ingredients were weighed into a carboard cup of a volume capacity of 600 cm³ and were mixed for seven seconds by a disk stirrer rotating at 2,500 rpm. A foam is formed in the cup as a result of the occurring polymerization reaction and the evolution of $CO_2$ which is liberated from the propellant. The foam was evaluated in respect to its height and cell structure. Table 1 indicates the final foam height after hardening and the cell structure. A polyoxyalkylene-polysiloxane-mixed block polymer is regarded as satisfactory if a high, fine foam block or body is formed.

Table 1

| Test No. | a | b | No. of Si atoms in average molecule | Ethylene oxide content of polyoxyalkylene block (% by weight) | Mole weight of the polyoxyalkylene block | Number of polyoxyalkylene blocks in average molecule | Number of i-propoxy units in average molecule | Foam height in cm | From evaluation (cell structure) |
|---|---|---|---|---|---|---|---|---|---|
| 1 | 1 | 0 | 4 | 90 | 1900 | 2 | — | 24.0 | fine, satisfactory |
| 2 | 2 | 0 | 6 | 75 | 1810 | 2 | — | 24.5 | fine, satisfactory |
| 3 | 4 | 0 | 10 | 75 | 1810 | 2 | — | 25.5 | fine, satisfactory |
| 4 | 0.5 | 1 | 5.5 | 75 | 1810 | 3 | — | 25.0 | fine, satisfactory |
| 5 | 1 | 0 | 4 | 85 | 800 | 2 | — | 25.0 | fine, satisfactory |
| 6 | 6.1 | 0 | 14.2 | 70 | 1750 | 2 | — | 24.5 | fine, satisfactory |
| 7 | 2 | 2 | 14 | 70 | 1815 | 4 | — | 23.0 | fine, satisfactory |
| 8 | 5.4 | 2 | 27.6 | 75 | 1810 | 4 | — | 25.5 | fine, satisfactory |
| 9 | 5.4 | 2 | 27.6 | 42 | 2500 | 4 | — | 23.5 | fine, satisfactory |
| 10 | 0.5 | 1 | 5.5 | 75 | 1810 | 1.5 | 1.5 | 24.0 | fine, satisfactory |
| 11 | 5.2 | 3 | 34 | 65 | 2000 | 4 | 1 | 25.0 | fine, satisfactory |

Table 1 — Continued

| Test No. | a | b | No. of Si atoms in average molecule | Ethylene oxide content of polyoxyalkylene block (% by weight) | Mole weight of the polyoxyalkylene block | Number of polyoxyalkylene blocks in average molecule | Number of i-propoxy units in average molecule | Foam height in cm | From evaluation (cell structure) |
|---|---|---|---|---|---|---|---|---|---|
| 12 | 1 | 0 | 4 | 42 | 1870 | 2 | — | 17.5 | coarse irregular and uneven |
| 13 | 4 | 0 | 10 | 42 | 1870 | 2 | — | 18.5 | coarse irregular and uneven |
| 14 | 0.5 | 1 | 5.5 | 60 | 1740 | 3 | — | 19.0 | coarse irregular and uneven |

Tests 11 through 14 are comparison tests and do not conform to the invention.

EXAMPLE II

In this example, a polyoxyalkylene-polysiloxane mixed block copolymer was produced and tested for suitability. The structure of the polymer had the average formula

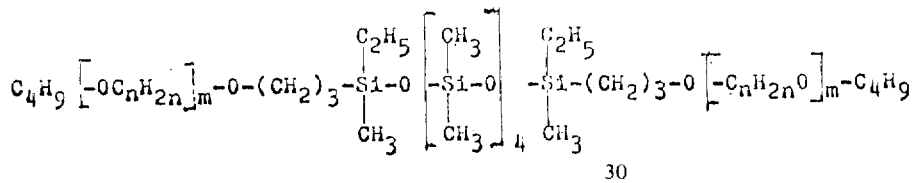

First 1,3-diethyl-1,3-dimethyldisiloxane of the formula

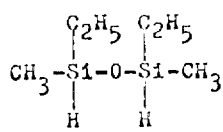

was produced by hydrolysis of ethylmethylchlorosilane in an ether solution. By equilibration with octamethylcyclotetrasiloxane in the presence of 1 gram of sulfuric acid per silicon atom and after a reaction period of 10 hours at 10°C, a siloxane is formed having the following average formula:

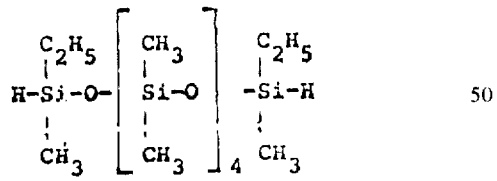

This siloxane is subjected to an addition reaction with an allylpolyether of the following formula:

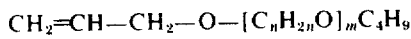

The mole weight of the polyoxyalkylene block in the polyether amounted to 1,800. The polyoxyalkylene block consisted of 75 percent by weight of ethylene oxide and 25 percent by weight of propylene oxide. 1.1 mole of allylpolyether were dissolved in toluene and dried by azeotropic distillation. Subsequently, 0.5 mole of the above siloxane were added. The reaction mixture was heated to 120°C. After this temperature had been reached, 180 mg of pyridine-ethylene-PtCl$_2$ were added as catalyst. After a reaction period of 15 hours, toluene is removed by distillation at reduced pressure and the reaction product obtained is filtered.

The iodine number was then ascertained in order to determine the still present allyl groups. This indicated a yield corresponding to 95 percent of the theoretical amount. By determining the remaining SiH-group, a yield of 98.5 percent could be calculated.

The polyoxyalkylene-polysiloxane-mixed block polymer produced in this manner was equivalent to the products indicated in the table as tests 1–11. It causes the formation of polyester foams of uniformly fine pore structure.

What is claimed is:

1. In a process of producing polyester foams on the basis of hardenable unsaturated polyesters in the presence of surface active foam stabilizers, the improvement which comprises using as foam stabilizer a polyoxyalkylene-polysiloxane mixed block polymer, said block polymer being characterized in that
   a. the polyoxyalkylene blocks of the polymer have an average mole weight of about between 500 to 3,000 and essentially consist of 40 to 100 percent by weight of ethylene oxide, the remainder being propylene oxide and/or higher alkylene oxides, with the proviso that when the proportion of ethylene oxide is 40–60 percent by weight, the molecular weight of the polyoxyalkylene blocks is > 2000, and
   b. the polysiloxane blocks of the polymer contain on the average 3 to 35 silicon atoms of which 2 through 30 are present in the form of dimethylsiloxy groups while the remaining silicon atoms form trifunctional siloxy units.

2. The improvement of claim 1, wherein said trifunctional siloxy units are bonded to said polyoxyalkylene blocks.

3. The improvement of claim 1, wherein said polyoxyalkylene-polysiloxane mixed block polymers contain 1.5 to 5 polyoxyalkylene blocks in the average molecule.

4. The improvement of claim 1, wherein said polyoxyalkylene-polysiloxane mixed block polymers contain 1.5-3 polyoxyalkylene blocks in the average molecule.

5. The improvement as claimed in claim 1, wherein said polyoxyalkylene polysiloxane mixed block polymers have polysiloxane blocks whose molecular weights are in close proximity to a mean value of molecular weight.

6. The improvement as claimed in claim 1, wherein the polysiloxane blocks of said polyoxyalkylene-polysiloxane mixed block polymers are equilibrated prior to reaction with the polyoxyalkylene glycol derivatives.

7. the improvement as claimed in claim 1, wherein said polyoxyalkylene-polysiloxane mixed block polymer has the average formula

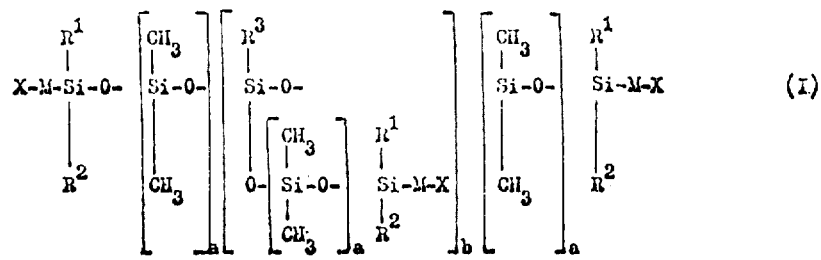

or

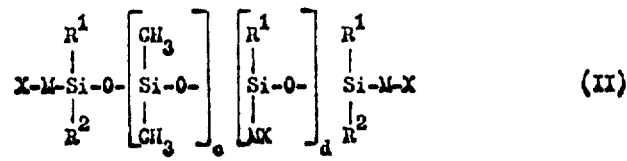

wherein
X stands for [—$C_nH_{2n}O$]$_m$ Z, wherein
m and n are numbers consistent with the definition of (a) in claim 1,
Z is alkyl, aryl or acyl,
M stands for O; —$CH_2O$—; —$(CH_2)_3O$—;

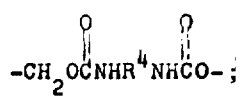

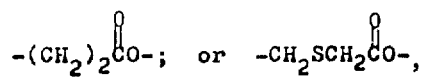

$R^1$ and $R^2$ are lower alkyl or have the same meaning as MX,
$R^3$ is the same as $R^1$ or

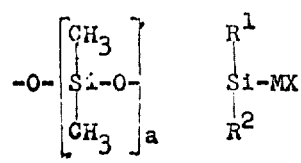

(I)

$R^4$ is a divalent hydrocarbon, $a = 0 - 10$;
$b = 0 - 4$ and $6 \geq a > 0$ while $b = 0-4$
$c = 1 - 29$;
$d = 0 - 4$ and $c + d = 1-33$, the values for $a$ and $b$ being further defined by the condition that at the most 35 and at least 3 Si-atoms are contained in the polysiloxane block and that of these Si-atoms, at least 2 and at the most 30 are present in the form of dimethysiloxy units.

8. The improvement of claim 6, wherein, when M is oxygen, at the most 50 percent of the X groups are alkyl or trialkylsilyl.

* * * * *